United States Patent [19]

Taylor et al.

[11] Patent Number: 4,593,233
[45] Date of Patent: Jun. 3, 1986

[54] LAMP DRIVE CIRCUIT

[75] Inventors: Joseph D. F. Taylor, Worcestershire; David Wiley, Staffordshire, both of England

[73] Assignee: Lucas Industries Public Limited Company, Birmingham, England

[21] Appl. No.: 396,559

[22] Filed: Jul. 9, 1982

[30] Foreign Application Priority Data

Jul. 24, 1981 [GB] United Kingdom ............... 8122857

[51] Int. Cl.⁴ .................. G05F 1/00; H05B 37/02; H05B 39/04; H05B 41/36
[52] U.S. Cl. .................................. 315/307; 315/82; 315/172; 315/173; 315/310; 307/10 BP; 320/25; 361/67; 361/78; 361/90
[58] Field of Search ............... 315/172, 173, 78, 82, 315/307, 308, 310, 83; 307/10 BP; 320/25; 361/67, 78, 88, 90, 91, 71, 72

[56] References Cited

U.S. PATENT DOCUMENTS

| | | | |
|---|---|---|---|
| 3,219,903 | 11/1965 | Larson | 320/25 |
| 3,300,702 | 1/1967 | Noddin | 320/25 |
| 3,883,777 | 5/1975 | Morita | 315/88 |
| 3,956,733 | 5/1976 | Sakurai | 315/82 |
| 4,104,560 | 8/1978 | Kato et al. | 315/83 |
| 4,189,662 | 2/1980 | Horng | 315/77 |
| 4,218,717 | 8/1980 | Shuster | 307/10 BP |
| 4,276,577 | 6/1981 | Gruson | 361/91 |
| 4,280,161 | 7/1981 | Kuhn et al. | 361/91 |
| 4,349,854 | 9/1982 | Mori et al. | 361/91 |
| 4,438,384 | 3/1984 | Akita | 320/48 |
| 4,458,286 | 7/1984 | Matsumura | 361/91 |
| 4,459,631 | 7/1984 | McNamee | 361/91 |

FOREIGN PATENT DOCUMENTS

| | | | |
|---|---|---|---|
| 2019678 | 10/1979 | United Kingdom | 307/10 BP |
| 0483736 | 7/1973 | U.S.S.R. | 307/10 BP |

OTHER PUBLICATIONS

"Modern Electronic Circuits Reference Manual", by John Markus, p. 247.

Primary Examiner—Saxfield Chatmon
Attorney, Agent, or Firm—Ladas & Parry

[57] ABSTRACT

An alternator circuit comprises an alternator having an armature winding, a field winding, a voltage regulator, a fault detecting circuit, a lamp drive circuit having its input connected to the output of the fault detecting circuit, and a warning lamp driven by the drive circuit. The drive circuit includes a capacitor connected across its input, an input transistor, an output transistor, a current measuring resistor connected in series with the output transistor, and a transistor sensitive to both the voltage drop across the warning lamp and the voltage drop in the current measuring resistor. In the event of excessive current flow through the output transistor, the voltage sensitive transistor rapidly charges the capacitor thereby turning off the output transistor. The capacitor then discharges slowly and the cycle is repeated. The high inrush current in the warning lamp does not cause the capacitor to be charged as the associated voltage drop across the lamp offsets the voltage drop in the current measuring resistor.

6 Claims, 1 Drawing Figure

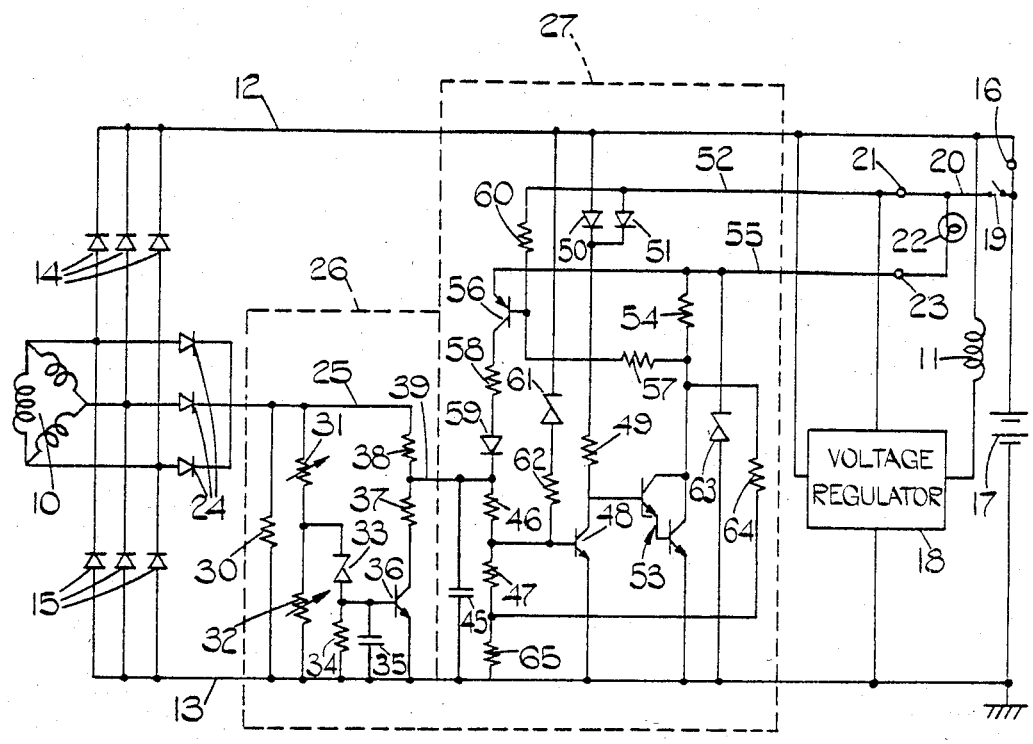

LAMP DRIVE CIRCUIT

This invention relates to a lamp drive circuit of the type which comprises a first supply input for connection to a first supply rail, a second supply input for connection to a second supply rail, a control input for receiving a control signal, a lamp output for connection to one side of a warning lamp, the other side of which, in use, is connected to the first supply rail, and switch means responsive to the signal at the control input and connected between the lamp output and the second supply input.

Where a lamp drive circuit of the type described forms part of a motor vehicle alternator circuit, it has been found that the connections to the first supply input and the warning lamp output may be accidentally reversed. This results in an excessive current being drawn by the lamp drive circuit and consequential damage. The lamp drive circuit may also be subjected to excessive current if the warning lamp becomes short circuited.

Accordingly, it is an object of this invention to provide a lamp drive circuit which is protected against excessive current.

According to this invention, there is provided a lamp drive circuit comprising a first supply input for connection to a first supply rail, a second supply input for connection to a second supply rail, a control input for receiving a control signal, a lamp output for connection to one side of a warning lamp, switch means and a current measuring resistor connected in series between the lamp output and the second supply input, the switch means being responsive to the signal at the control input, and voltage sensitive means responsive to the voltage drop across the current measuring resistor and arranged to restrict current flow through the switch means in the event of the voltage drop exceeding a predetermined value.

By restricting the current flow through the switch means when the voltage drop exceeds the predetermined value, the switch means is protected against excessive currents.

This invention will now be described in more detail, by way of example, with reference to the accompanying drawing which is a circuit diagram of a motor vehicle alternator circuit including a lamp drive circuit embodying this invention.

Referring now to the drawing, the alternator circuit there shown comprises an alternator having a three phase armature winding 10 and a field winding 11. The armature winding 10 supplies current to positive and negative supply rails 12 and 13 through diodes 14 and 15. The positive supply rail 12 is connected through a terminal 16 to the positive pole of a vehicle battery 17, the negative pole of which is connected to earth and to the negative supply rail 13. The field winding 11 is connected to a voltage regulator 18 of well known construction which switches the field winding 11 on and off in accordance with the voltage appearing across the rails 12 and 13. The positive pole of the battery is connected through an ignition switch 19 to a rail 20, the rail 20 being connected directly to a terminal 21 and through a warning lamp 22 to a terminal 23. The circuit further includes a set of auxiliary diodes 24 which supply current to a rail 25, a fault detection circuit 26, and a lamp drive circuit 27.

The fault detection circuit 26 comprises a resistor 30 connected between the rail 25 and the rail 13 and a pair of variable resistors 31, 32 connected in series between rails 25 and 13. The junction of resistors 31 and 32 is connected to the cathode of a zener diode 33, the anode of which is connected to rail 13 through a resistor 34 and a capacitor 35 connected in parallel. The anode of zener diode 33 is also connected to the base of an NPN transistor 36, the emitter of which is connected to rail 13 and the collector of which is connected through a pair of resistors 37 and 38 to the rail 25. The resistor 37 has a much smaller resistance value than the resistor 38. The output signal of the detection circuit 26 is provided at the junction of resistors 37 and 38 and this junction is connected to a rail 39.

In the lamp drive circuit 27, the rail 39 forms a control input and this rail is connected to rail 13 by a capacitor 45 and also by three resistors 46, 47 and 65 connected in series. The junction of resistors 46 and 47 is connected to the base of an NPN transistor 48, the emitter of which is connected to rail 13. The collector of transistor 48 is connected through a resistor 49 to the cathodes of a pair of diodes 50, 51. The anode of diode 50 is connected to rail 12 and the anode of diode 41 is connected to a rail 52. The rail 52 is connected to terminal 21, the terminal 21 forming a first supply input for the lamp drive circuit 27. The rail 13 acts as the second supply input. The circuit 27 further includes a switch means in the form of an NPN Darlington transistor 53, the base of which is connected to the collector of transistor 48, the emitter of which is connected to rail 13 and the collector of which is connected through a current measuring resistor 54 to a rail 55. The rail 55 is connected to terminal 23 and terminal 23 comprises a warning lamp output for the circuit 27. The circuit 27 further includes a voltage sensitive means in the form of a PNP transistor 56. The emitter of transistor 56 is connected to rail 55, its base is connected through a resistor 57 to the junction of resistor 54 and transistor 53, and its collector is connected through a resistor 58 to the anode of a diode 59, the cathode of which is connected to rail 39. The base of transistor 56 is also connected through a resistor 60 to the rail 52. The rail 12 is connected to the cathode of a zener diode 61, the anode of which is connected through a resistor 62 to the base of transistor 48. In order to protect transistor 53, there is provided a zener diode 63, the anode of which is connected to rail 13 and the cathode of which is connected to rail 55. Finally, the collector of transistor 53 is connected to the junction of resistors 47 and 65 via a resistor 64.

The operation of the circuit will now be described.

With the ignition switch 19 closed and the alternator 10 producing no output, the fault detection circuit 26 supplies no current on rail 39. Consequently, capacitor 45 is discharged, transistor 48 is off, transistor 53 is on and the warning lamp 22 is energised. With the alternator 10 operating normally and producing current, capacitor 45 will be charged from rail 39 thereby turning on transistor 48, turning off transistor 53 and de-energising the warning lamp 22. In the event of armature 10 producing an excessive voltage, the voltage at the junction of resistors 31 and 32 will be sufficient to cause breakdown of zener diode 33 and thereby turning on transistor 36, discharging capacitor 45 and turning off transistor 48, and thereby turning on transistor 53 and energising the warning lamp 22. In the case of over voltage, hysteresis is provided by resistors 64 and 65 and the feedback to transistor 48.

In normal operation of the lamp drive circuit 27, the voltage drop across the current measuring resistor 54 is insufficient to turn-on transistor 56. However, under certain abnormal conditions such as reversal of the connections at terminals 21 and 23, or short circuiting of the warning lamp 22, the current flow through resistor 54 will become sufficient to turn-on transistor 56. When transistor 56 turns on, capacitor 45 charges rapidly until it reaches a voltage at which transistor 48 is turned on thereby turning off transistor 53. When transistor 53 is turned off, current is removed from resistor 54 thereby turning off transistor 56. The capacitor 45 now discharges slowly through resistors 46 and 47 until transistor 48 eventually turns off and transistor 53 again turns on. This cycle is then repeated with a mark-space ratio depending mainly on the value of resistors 58 and 46. Thus, the lamp drive circuit 27 is protected against excessive currents which might otherwise occur in the abnormal conditions mentioned above.

It is to be noted that the transistor 56 does not sense the full voltage drop across the resistor 54 as the voltage at its base is raised by resistors 60 and 57. When the lamp 22 is energised, the initial current is high and this initial high current is associated with a voltage drop across the lamp 22. The resistors 60 and 57 are provided to take advantage of the voltage drop across the lamp 22 in order to prevent the initial high current turning on transistor 56. Their resistance values are chosen accordingly.

In the event of a high transient voltage appearing between rails 12 and 13, zener diode 61 breaks down thereby turning on transistor 48 and turning off transistor 53 and protecting the warning lamp 22.

The lamp drive circuit 27 may be formed entirely from discrete components. Alternatively, the transistor 53 may be a discrete component and the remainder of the circuit may be formed as a integrated circuit.

It is to be noted that if a thermal cut-out device were used in place of the resistor 54 and transistor 56 to limit the current it would be necessary to form the entire lamp drive circuit 27 as an integrated circuit. The inclusion of transistor 53 in such a circuit would make it costly.

Although the lamp drive circuit 27 has been shown as forming part of an alternator circuit, it is to be appreciated that the lamp drive circuit 27 is suitable for any application where excessive currents may occur.

We claim:

1. A lamp drive circuit comprising a first supply input for connection to a first supply rail, a second supply input for connection to a second supply rail, a control input for receiving a control signal, a lamp output for connection to one side of a warning lamp, switch means and a current measuring resistor connected in series between the lamp output and the second supply input, a capacitor connected between the control input and the second supply input so as to be charged via the control input, the voltage across the capacitor controlling the state of the switch means so that the switch means is non-conductive when the capacitor is charged, and voltage sensitive means responsive to the voltage drop across the current measuring resistor and arranged to charge the capacitor in the event of the voltage drop exceeding a predetermined value and thereby rendering the switch means non-conductive, the capacitor subsequently discharging until the switch means is again rendered conductive, whereby the switch means is driven repetitively non-conductive and conductive thereby preventing the mean current through the switch means exceeding an excessive value.

2. A circuit as claimed in claim 1 in which the voltage sensitive means comprises a transistor having its base-emitter path connected in series with the current measuring resistor.

3. A circuit as claimed in claim 2 in which one end of the current measuring resistor is connected directly to one of the base and emitter junctions of the transistor, and the other end of the current measuring resistor is connected to the first supply input through a pair of resistors and ignition switch, the junction of the pair of resistors being connected to the other of the base and emitter junctions of the transistor.

4. A circuit as claimed in claim 1 or claim 2 in which the switch means is formed from at least one discrete transistor and the remainder of the circuit is formed as an integrated circuit.

5. A circuit as claimed in claim 1 or claim 2 in which the switch means is formed from at least one transistor and that the entire circuit is formed from discrete components.

6. An alternator circuit including a lamp drive circuit as claimed in claim 1 and further including an alternator having an armature winding and a field winding, a rectifier connected to the armature winding, a voltage regulator for controlling current flow through the field winding, and a circuit for detecting faults in the alternator, the output of the fault detecting circuit supplying the control signal for the lamp drive circuit.

* * * * *